United States Patent [19]
Liem et al.

[11] Patent Number: 5,960,342
[45] Date of Patent: Sep. 28, 1999

[54] ELIMINATED DTMF SIGNALING IN AN INTEGRATED WIRELINE-WIRELESS SYSTEM

[75] Inventors: Susanna Liem, Fort Worth; Arshad Mirza, Plano, both of Tex.

[73] Assignee: Samsung Telecommunications America, Inc., Richardson, Tex.

[21] Appl. No.: 08/942,713

[22] Filed: Oct. 2, 1997

[51] Int. Cl.⁶ .................................................. H04M 11/00
[52] U.S. Cl. ......................... 455/428; 455/560; 455/557
[58] Field of Search .................................... 455/426, 428, 455/445, 560, 556, 557

[56] References Cited

U.S. PATENT DOCUMENTS 5,694,459  12/1997  Backaus et al. ....................... 379/427
5,758,281  5/1998  Emery et al. ........................... 455/428

FOREIGN PATENT DOCUMENTS

WO 98/23095  5/1998  WIPO .

*Primary Examiner*—Nguyen Vo
*Assistant Examiner*—Duc Nguyen
*Attorney, Agent, or Firm*—Jones Volentine, LLP

[57] ABSTRACT

An integrated wireless wireline system (IWWS) architecture without the requirement for dual-tone modulation frequency (DTMF) signaling to communicate a called party's number from the wireless section to the wireline section, thereby expediting call setup and making it more reliable.

10 Claims, 1 Drawing Sheet

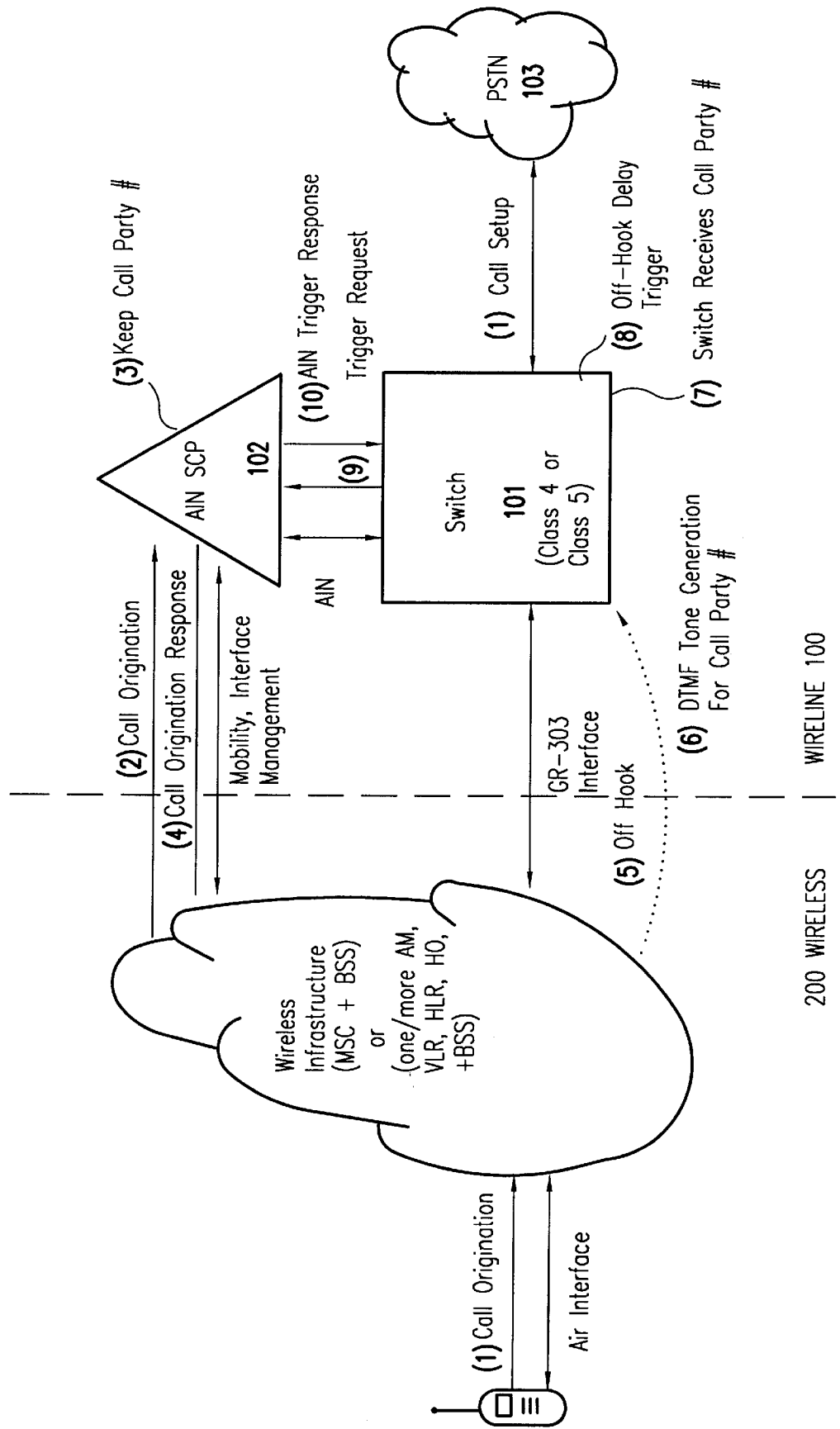

ELIMINATED DTMF SIGNALING IN AN INTEGRATED WIRELINE-WIRELESS SYSTEM

BACKGROUND OF THE INVENTION

1. Field of the Invention

The present invention relates to wireless communication systems. More particularly, the present invention relates to an improved integrated wireless-wireless system (IWWS) which eliminates the requirement of dual-tone modulation frequency (DTMF) signaling between the wireless and wireline sections.

2. Description of the Related Art

Increasing demand for convenient and universally available wireless communication is driving the development of new networking techniques that accommodate mobile voice and data users who move throughout cites, broad geographic regions, and even between countries.

As used throughout this description, "wireless" refers to a broad class of communication systems and technologies utilizing open air interface. Mobile telephone, cellular telephone, wireless local-loop, paging, and personal communication systems (PCS) are ready examples of wireless communication systems adaptable to an IWWS architecture. As used throughout this description, "wireline" refers to network elements normally associated with the public switched telephone network (PSTN), but may also include ISDN, public databases and similar landline based services.

The term "communicat[ing]" is used to reference a broad class of information exchange between network sections and elements. Communication may be made via hardware links and/or open-air interfaces, and may involve complex, bi-directional hand-shaking as is commonly understood in the telecommunications field. The term "call" is used to reference any party to party data transfer such as PCS, as well as traditional voice telephone calls.

Historically, the demand for wireless communication has consistently exceeded the capacity of available technology. Recent efforts to expand wireless communication and to better import wireline features and performance into wireless communication has resulted in dramatic changes to network architecture. An IWWS has been proposed in U.S. application Ser. No. 08/942,895, filed Oct. 2, 1997 which is incorporated herein by reference.

The IWWS provides an architecture which does not necessarily require a Mobile Switching Center (MSC), but which effectively uses existing wireline switching equipment and capabilities to provide integrated wireless/wireline services to users. The resulting "meld" of wireless communication system components with wireline network components offers many commercial and technical advantages to service providers. For example, the IWWS architecture allows service providers to reduce network equipment purchases, to lower maintenance costs, and to simplify equipment integration. In fact, service providers offering wireline and wireless services have the option of leveraging existing wireline capabilities, without recourse to a separately procured MSC, to effect lower cost wireless services.

Not only are hardware costs lowered by the elimination of the MSC, but also service providers may easily integrate wireline and wireless billing requirements, readily import the rich features currently offered in wireline service into wireless service, integrate wireline directory numbers, and centralize physical operations and maintenance centers.

However, the proposed IWWS is not without drawbacks. As presently proposed, the GR-303 signaling interface which connects the wireline and wireless sections in the IWWS requires that dual-tone modulation frequency (DTMF) signaling be implemented in the wireless section. That is, since GR-303 hybrid signaling is an analog technique, i.e., a technique using Robbed Bits Signaling (RBS), and not a message based technique, the called party's number must be sent from the wireless section to the wireline section using DTMF signaling. Such a requirement necessitates undesired hardware and firmware in the wireless section to handle DTMF signaling.

Further, call setup is delayed by the amount of time required to apply and detect the dial tone at the wireline switch, and the subsequent time required to transmit, digit by digit, the called party's number from the wireless infrastructure to the switch via the GR-303 interface.

SUMMARY OF THE INVENTION

The present invention provides an integrated wireless and wireline system (IWWS) architecture which does not require dual-tone modulation frequency (DTMF) signaling between the wireless and wireline sections of the network. As a result, call setup is expedited and more reliable.

In one aspect, the present invention comprises a call connection method in an IWWS, wherein the wireline section and the wireless section communicate via a mobility management interface and a GR-303 interface. The method includes at least the steps of communicating a called party's number from the wireless section to the wireline section via the mobility management interface, and performing off-hook immediate call setup at the wireline section once an off-hook signal is received from the wireless section via the GR-303 interface.

The wireline section may include a switch and an advanced intelligent network service control point (AIN SCP), wherein the called party's number is communicated from the wireless section to the AIN SCP via the mobility management interface, and wherein the switch is connected to the wireless section via the GR-303. The switch is preferably a Class 5 or a Class 4 switch.

In another aspect, the present invention comprises a method of communicating a called party's number in an IWWS, in which the wireline section includes a switch and an AIN SCP communicating via an AIN link, wherein the wireless section communicates with the switch via a GR-303 interface and communicates with the AIN SCP via a mobility management interface. The method includes the steps of communicating the called party's number from the wireless section to the AIN SCP via the mobility management interface upon receiving a call origination request from a calling wireless user, and communicating a call origination response from the AIN SCP back to the wireless section in response to the call origination request. Thereafter, an off-hook signal from the wireless section is communicated to the switch via the GR-303 interface and an off-hook immediate call setup is performed at the switch upon receiving the off-hook signal.

In yet another aspect, the present invention comprises an integrated wireline-wireless system connecting a calling wireless party with a called party identified by a called party number. The system comprises a wireless infrastructure communicating with the wireless calling party via an open air interface and a wireline section comprising a switch and an AIN SCP. The switch is connected to the wireless infrastructure via a GR-303 interface and is configured for off-hook immediate call setup upon receiving an off-hook signal from the wireless infrastructure via the GR-303 interface, and the AIN SCP is connected to the wireless infrastructure via a mobility management interface to receive the called party number from the wireless infrastructure.

BRIEF DESCRIPTION OF THE DRAWING

The drawing illustrates the method of the present invention as implemented in an IWWS.

DETAILED DESCRIPTION OF THE INVENTION

In the drawing, a wireline section 100 is shown integrated with a wireless section 200 in a typical (IWWS) architecture. Wireline section 100 comprises a switch 101, normally part of PSTN 103 but shown separately here for clarity, and an Advanced Intelligent Network Service Control Point (AIN SCP) 102. Switch 101 is preferably a Class 4 or a Class 5 switch.

Wireless section 200 comprises a wireless infrastructure having a variety of possible configurations which communicate with mobile units. The wireless infrastructure may comprise the combination of a Mobile Switching Center (MSC) and a Base Station Subsection (BSS), or the combination of a BSS and any one of a number of selected platforms including an access manager (AM), a Visited Location Register (VLR), a Home Location Register (HLR), and Handover Controller (HO). The BSS comprises one or more functional elements such as a Base Transceiver Subsystem (BTS) and a Base Station Controller (BSC) required to locate and communicate with mobile units in the wireless section.

The combination of an AIN SCP controlling a switch which is connected to the wireless infrastructure requires that a wireless application service be developed in the AIN SCP. Such an AIN application development is conventional and will be accomplished by the designer to implement desired features in the wireless section and in accordance with the performance characteristics of the wireless/wireline hardware.

Switch 101 communicates with hardware in the wireless infrastructure via a GR-303 Signaling Interface. Switch 101 also communicates with AIN SCP 102 via an AIN link. Finally, AIN SCP 102 communicates with the MSC or various platforms normally included in a MSC of the wireless infrastructure via a mobility management interface, such as modified IS-41 or IS-634.

Referring to the drawing, the existing method of effecting call setup between a wireless calling party and a called party in the proposed IWWS will be described, and thereafter the present invention will be described with reference to all of the foregoing. For ease of reference the steps generally comprising the method are indicated by numbers, (#), in the drawing.

When a call originates from a wireless user, a call origination message is communicated from a mobile handset to the wireless infrastructure (1). Upon call origination at the wireless infrastructure, a message indicating call origination or a qualification request message is communicated from the wireless infrastructure to AIN SCP 102 (2). At this point, AIN SCP 102 receives the qualification request message, executes a new call termination process within wireline section 100, stores the associated call information (3) communicated as part of the qualification request message, and communicates a call origination response to the wireless infrastructure (4).

Upon receiving the call origination response, the wireless infrastructure begins the process of call establishment with switch 101 via the GR-303 interface by communicating an off-hook signal (5). Once the off-hook signal is recognized at switch 101, the called party's number is communicated "in-band" via the GR-303 interface using a DTMF generator resident in the wireless infrastructure (6). After the called party's number is received by switch 101 (7), an AIN off-hook delay trigger is communicated from switch 101 to AIN SCP 102 (9). AIN SCP 102 responds with an AIN trigger message (10), and call setup is completed in switch 101 (11).

In the foregoing method, the wireless infrastructure must include the hardware and firmware necessary to generate and transmit DTMF data. Even if provision is made for such hardware and firmware, the process of in-band DTMF data transmission from the wireless infrastructure to switch 101, and from switch 101 to AIN SCP 102 is a lengthy one, and one subject to communication errors. The present invention does away with the necessity of DTMF related hardware and firmware in the wireless infrastructure. As a result, call origination setup time is reduced and the reliability of called party number transmission is improved.

In the present invention, when a call originates from a wireless user, a call origination message is communicated from a mobile handset to the wireless infrastructure (1). Upon call origination at the wireless infrastructure, a message indicating call origination or a qualification request is communicated from the wireless infrastructure to AIN SCP 102 (2). Unlike the call origination message in the previous method, the present invention communicates the called party's number as part of this message. Since this message must always be sent the additional overhead required to communicate the called party's number "out-of-band" is minimal. Thus, when AIN SCP 102 receives the call origination message, executes a new call origination process within wireline section 100, and stores the associated call information (3), the called party number is included in the stored information. With this information stored, AIN SCP 102 communicates a call origination response to the wireless infrastructure (4).

Upon receiving the call origination response, the wireless infrastructure begins the process of call establishment with switch 101 via the GR-303 interface by communicating an off-hook signal (5). However, in the present invention, unlike the previously described IWWS, switch 101 is configured to create an immediate AIN off-hook trigger (replacing (6, 7, 8) above). Thus, once an off-hook signal is detected at switch 101, the "off-hook immediate" configuration sends origination attempt message to AIN SCP 102. If AIN SCP 102 determines that the call is authorized, it responds with an AIN trigger response (10) including call routing information and the called party's number previously received and stored. Upon receiving the AIN trigger response message, switch 101 completes call setup (11).

In effect, the present invention is similar to a telephone "hotline." In a hotline, the direct one-for-one nature of the connection between the calling party and the called party requires no dialed number decoding. Rather, as soon as the calling party's handset goes off-hook, it is connected to the called party. In the present invention, switch 101, as configured for off-hook immediate operation, does not expect a called party's number to be communicated from the wireless infrastructure. As a result, no DTMF data generation, detection and collection is required.

One of ordinary skill will appreciate that the present invention is adaptable to many wireless section configurations. Examples including a MSC and omitting an MSC have been discussed. Given the rather arbitrary line between wireline and wireless, one of ordinary skill will understand that the present invention may be implemented in either the wireless or wireline sections, but is preferably implemented in either an AIN SCP or in an MSC.

The term "off-hook immediate" as used herein describes any switch configuration which does not require DTMF, or equivalent called party identification signaling, from the wireless section to the switch via the GR-303 interface.

The foregoing embodiments have been given by way of example. The present invention is taught by these examples is not limited thereto. Rather, one of ordinary skill in the art will understand that numerous modifications and alterations can be made to the specific elements comprising network architectures adaptable to the present invention without departing from the scope of the following claims which define the invention.

What is claimed is:

1. A call connection method in a communication system having integrated wireline and wireless sections, wherein the wireline section and the wireless section communicate via a mobility management interface and a GR-303 interface, the method comprising the steps of:

communicating a called party's number from the wireless section to the wireline section via the mobility management interface; and performing off-hook immediate call setup at the wireline section once an off-hook signal is received from the wireless section via the GR-303 interface.

2. The method of claim 1, wherein the wireline section includes a switch and an advanced intelligent network service control point (AIN SCP), wherein the called party's number is communicated from the wireless section to the AIN SCP via the mobility management interface, and wherein the switch is connected to the wireless section via the GR-303.

3. The method of claim 2 wherein the switch is one of a Class 5 or a Class 4 switch.

4. The method of claim 3, wherein the wireless section includes a mobile switching center (MSC) communicating with the AIN SCP via the mobility management interface and communicating with the switch via the GR-303.

5. The method of claim 3, wherein the wireless section includes at least one of a group consisting of a Visited Location Register (VLR), an access manager (AM), a Home Location Register (HLR) and a Handover Controller (HO) in combination with a Base Station Subsystem (BSS).

6. A method of communicating a called party's number in a communication system having integrated wireline and wireless sections, the wireline section comprising a switch and an advanced intelligent network (AIN) service control point (SCP) communicating via an AIN link, and the wireless section communicates with the switch via a GR-303 interface and communicates with the AIN SCP via a mobility management interface, the method comprising the steps of:

upon receiving a call origination request from a calling wireless user, communicating the called party's number from the wireless section to the AIN SCP via the mobility management interface;

communicating a call origination response from the AIN SCP to the wireless section in response to the call origination request;

upon receiving the call origination response, communicating an off-hook signal from the wireless section to the switch via the GR-303 interface; and performing off-hook immediate call setup at the switch upon receiving the off-hook signal.

7. An integrated wireline-wireless system connecting a calling wireless party with a called party identified by a called party number, the system comprising:

a wireless infrastructure communicating with the wireless calling party via an open air interface; and a wireline section comprising a switch and an Advanced Intelligent Network (AIN) Service Control Point (SCP), wherein the switch is connected to the wireless infrastructure via a GR-303 interface and is configured for off-hook immediate call setup upon receiving an off-hook signal from the wireless infrastructure via the GR-303 interface, and wherein the AIN SCP is connected to the wireless infrastructure via a mobility management interface to receive the called party number from the wireless infrastructure.

8. The system of claim 7, wherein the switch is one of a Class 5 and a Class 4 switch.

9. The system of claim 7, wherein the wireless section includes a mobile switching center (MSC) communicating with the AIN SCP via the mobility management interface and communicating with the switch via the GR-303.

10. The system of claim 7, wherein the wireless section includes at least one of a group consisting of a Visited Location Register (VLR), an access manager (AM), a Home Location Register (HLR) and a Handover Controller (HO) in combination with a Base Station Subsystem (BSS).

* * * * *